United States Patent [19]

Smith

[11] Patent Number: 4,500,271

[45] Date of Patent: Feb. 19, 1985

[54] UNDERWATER PELLETIZER WITH ADJUSTABLE BLADE ASSEMBLY

[75] Inventor: Donald W. Smith, Fincastle, Va.

[73] Assignee: Gala Industries, Inc., Eagle Rock, Va.

[21] Appl. No.: 558,470

[22] Filed: Dec. 6, 1983

[51] Int. Cl.³ .......................... B29C 17/14; B29F 3/00
[52] U.S. Cl. .......................................... 425/67; 83/700; 384/259; 425/308; 425/311; 425/313
[58] Field of Search .............. 425/67, 308, 310, 311, 425/6, 313; 83/699, 700; 384/249, 252, 259, 260, 253

[56] References Cited

U.S. PATENT DOCUMENTS

| | | | |
|---|---|---|---|
| 2,548,599 | 4/1951 | Garr | 241/37 |
| 3,317,957 | 5/1967 | Heston et al. | 425/67 |
| 3,323,170 | 6/1967 | Swickard et al. | 425/379 |
| 3,337,913 | 8/1969 | List | 425/313 |
| 3,564,650 | 2/1971 | Irving | 425/310 |
| 3,624,830 | 11/1971 | Stehower | 425/313 |
| 3,676,029 | 7/1972 | Hopkin | 425/67 |
| 3,685,751 | 8/1972 | Anders | 425/311 |
| 3,832,114 | 8/1974 | Yoshida | 425/313 |
| 3,912,434 | 10/1975 | Nagahara et al. | 241/37 |
| 4,021,176 | 5/1977 | Dettmer et al. | 425/313 |
| 4,099,900 | 7/1978 | Bradbury et al. | 425/445 |
| 4,123,204 | 10/1978 | Scholle | 417/395 |
| 4,182,605 | 1/1980 | Dettmer | 425/311 |
| 4,184,833 | 1/1980 | Buchan et al. | 425/313 |
| 4,285,652 | 8/1981 | Anders | 425/313 |
| 4,290,742 | 9/1981 | Scharer et al. | 425/313 |

*Primary Examiner*—Willard E. Hoag
*Attorney, Agent, or Firm*—Harvey B. Jacobson

[57] ABSTRACT

A manually adjustable blade assembly for an underwater pelletizer to enable radial adjustment and axial adjustment as well as maintaining parallelism of the blade assembly to the die cutting surface through the use of a shaft bearing support for the driven cutter blade assembly which enables accurate and positive adjustment of the rotating cutter blade assembly in relation to the cutting surface of a die in an underwater pelletizer. The shaft bearing support includes a screw-threaded adjustable bearing housing threaded into a bearing support plate having a base provided with vertical adjustment capability and lateral horizontal adjustment capability thereby enabling accurate axial adjustment of the cutting blade as well as radial adjustment and maintenance of parallelism between the cutting edges of the blades and the cutting surface of the die in an underwater pelletizer in a manner which maintains the cost at a minimum and provides a relatively uncomplicated structure to facilitate replacement of parts with the manual adjustment providing for longer blade life and flexibility for pelletizing various polymers.

6 Claims, 4 Drawing Figures

U.S. Patent  Feb. 19, 1985  4,500,271
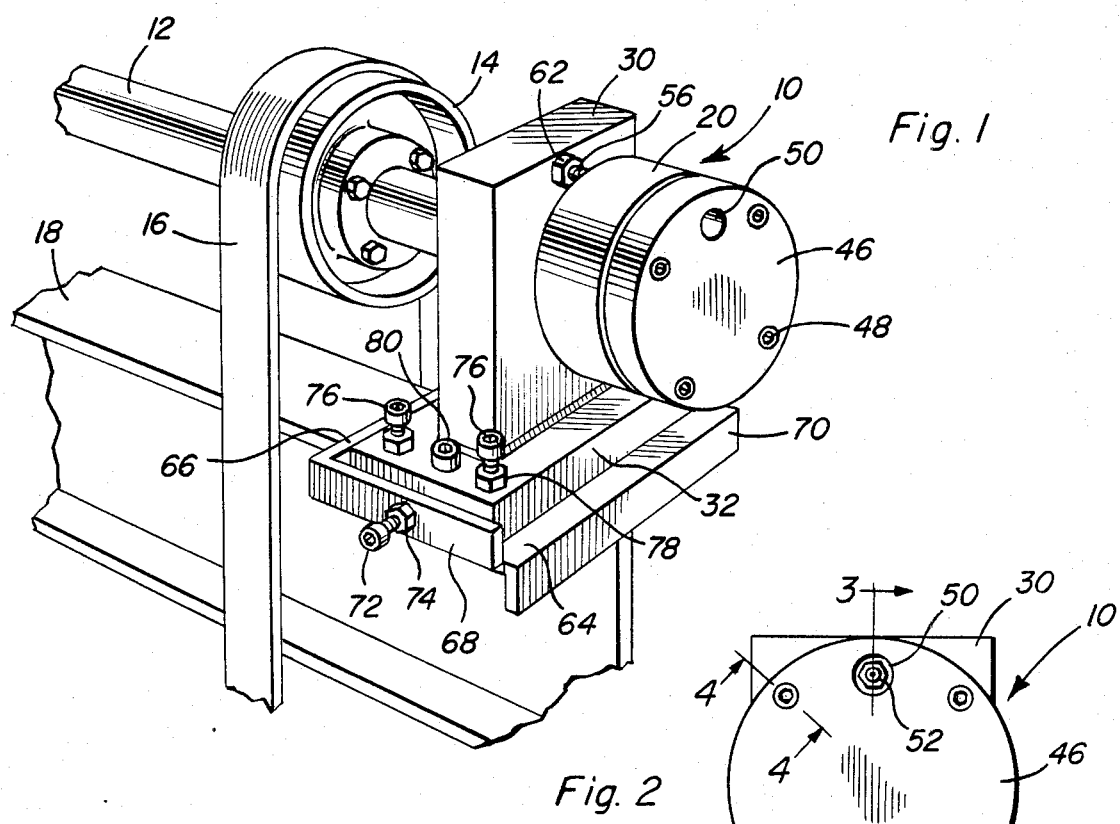
Fig. 1
Fig. 2
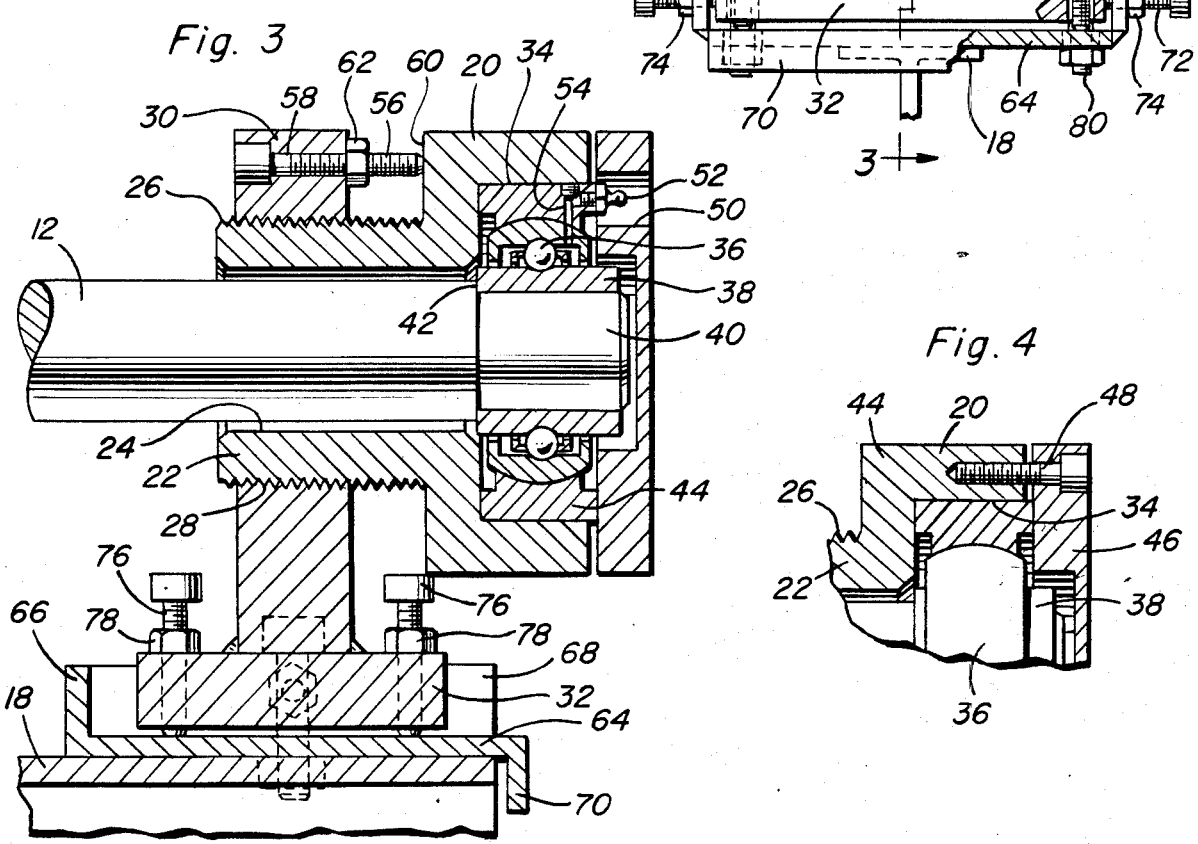
Fig. 3
Fig. 4

UNDERWATER PELLETIZER WITH ADJUSTABLE BLADE ASSEMBLY

BACKGROUND OF THE INVENTION

1. Field of the Invention

The present invention generally relates to underwater pelletizing of polymers and more particularly a unique arrangement for manually adjusting the relationship of the rotating blade assembly to the cutting surface of the die for prolonged life expectancy of the cutting edges of the blade assembly and enabling efficient cutting of various polymers being extruded through the die with the blade adjustment enabling axial movement of the blade, radial movement of the blade and parallel alignment of the cutting edges of the blades with the cutting surface on the die associated with the cutting edges during rotation of the cutting blade assembly.

2. Description of the Prior Art

Prior patent No. 4,123,204 issued to Vernon E. Dudley on Oct. 31, 1978 and having a common assignee discloses an underwater pelletizer with a rotating blade assembly associated with the cutting surface of the die with a manual adjustment being provided for axially adjusting of the rotating blade assembly in relation to the cutting surface of the die. In addition, the following U.S. patents disclose various related structures.

| | |
|---|---|
| 3,323,170 | 6/6/67 |
| 3,337,913 | 8/29/69 |
| 3,564,650 | 2/23/71 |
| 3,685,751 | 8/22/72 |
| 3,832,114 | 8/27/74 |
| 3,912,434 | 10/14/75 |
| 4,099,900 | 7/11/78 |
| 4,182,605 | 1/8/80 |

SUMMARY OF THE INVENTION

An object of the present invention is to provide a manually adjustable blade assembly for underwater pelletizers including adjustment capabilities in an axial linear direction, a radial direction and an adjustment to maintain the cutting edges of the blade assembly in parallelism to the cutting surface of the die to provide for long cutting blade life and flexibility of use in cutting pellets when various polymers are used.

Another object of the invention is to provide a blade adjustment in accordance with the preceding object in which the driven shaft supporting the blade assembly is supported by a bearing housing that is threadedly adjustably mounted in a bearing support plate for enabling axial linear adjustment of the shaft and blade in relation to the cutting surface of the die.

A further object of the invention is to provide a blade adjustment in accordance with the preceding objects in which the bearing plate is supported from a base having lateral adjustment and vertical adjustment capabilities and the capability of varying the vertical orientation of the bearing support plate by providing the base with four vertical adjustment screws oriented in generally a rectangular pattern.

Still another object of the invention is to provide a blade adjustment for an underwater pelletizer which is simple in construction, provided with components which are assembled in a manner to enable easy replacement when necessary and capable of effectively and accurately adjusting the rotatable blade assembly in relation to the cutting surface of the die to provide efficient cutting of pellets even when various polymers are used.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmental perspective view of the driven end portion of the rotatable blade assembly for an underwater pelletizer illustrating the manual adustment of the present invention.

FIG. 2 is an end elevational view of the structure of FIG. 1 with portions broken away illustrating structural details of the lateral adjustment feature.

FIG. 3 is a vertical sectional view taken substantially upon a plane passing along section line 3—3 on FIG. 2 illustrating the specific structural details of the manual adjustment for the blade assembly.

FIG. 4 is a fragmental sectional view taken substantially upon a plane passing along section line 4—4 on FIG. 2 illustrating additional details of the structure of the bearing housing and end cap.

DESCRIPTION OF THE PREFERRED EMBODIMENT

Referring now specifically to the drawings, the blade adjustment of the present invention is generally designated by the numeral 10 and is associated with an underwater pelletizer in the same manner as the blade assembly illustrated in prior patent No. 4,123,207 which is incorporated herein by reference thereto with the drive shaft 12 being illustrated along with the drive pulley 14, drive belt 16 and supporting frame structure 18 in the form of a beam or the like. The components of the underwater pelletizer and the drive belt and shaft structure and supporting framework are conventional and may be the same as or similar to that disclosed in the above-mentioned patent. The manual adjustment structure 10 of the present invention includes a bearing housing 20 in the form of a cylindrical wheel or the like which may have an external roughened surface for ease of gripping. The cylindrical housing 20 includes an extension 22 of reduced diameter and of cylindrical construction having a passageway 24 with a diameter slightly greater than the diameter of the shaft 12. The extension 22 is externally threaded as at 26 and is screw-threaded through an internally threaded aperture 28 in a bearing support plate 30 which is in the form of a rectangular plate supported in upright position by a base plate 32. By rotating the bearing housing 20, it may be moved in an adjustable threaded manner in relation to the bearing support plate 30.

The bearing housing includes an enlarged cylindrical recess 34 in the end thereof remote from the extension 22 which receives a bearing assembly 36 that has an inner race 38 on a reduced extension 40 on the shaft 12 and abutting the shoulder 42 thereon and an outer race 44 received in the recess 34 so that the bearing assembly 36 which may be a thrust ball bearing assembly rotatably supports the shaft 12 from the bearing housing 20 and thus from the bearing support plate 30. The bearing housing 20 includes an end plate 46 secured to the housing 20 by cap screws 48 or similar fastening devices with the end plate 46 also engaging the outer end of the outer bearing race 44 thus securely retaining the bearing race and thus the bearing assembly 36 including the inner bearing race 38 in the recess and in protected relation with the end cap 46 including an aperture 50 providing access to a lubrication fitting 52 in communication with a passageway 54 for lubricant being pumped into the bearing assembly 36 in a conventional manner by using a grease gun or other pressure pump arrangement. Thus, with this arrangement, rotation of the bearing housing 20 by grasping the exterior of the housing 20 or end cap 46 will cause axial movement of the housing 20 in relation to the bearing support plate 30 and also axial adjustment of the shaft 12 in a linear manner along the axis of rotation thereof.

The upper end of the bearing support plate 30 includes an externally threaded stop screw 56 extending through an internally threaded bore 58 with the free end of the stop screw 56 engaging the axial surface of the shoulder 60 on the housing 20 in radially outwardly relation to the extension 20. A lock nut 62 is provided on the stop screw 56 to abut the surface of the bearing support plate 30 and lock the stop screw 56 in adjusted position to limit the movement of the bearing housing inwardly thus limiting the inward movement of the rotatable blade assembly toward the cutting surface of the die of the underwater pelletizer.

The base plate 32 is supported from the frame or supporting structure 18 by a supporting plate 64 having an upturned inner flange 66 and up-turned side flanges 68 rigid therewith and a downturned flange 70 at the outer end thereof so that the base plate 32 can be slid onto the support plate 64 or slid off of the support plate 64 when desired. As illustrated, the base plate 32 is dimensioned so that it is spaced from the side flanges 68 with adjustment cap screws 72 being threaded through the side flanges 68 into engagement with the side edges of the base plate 32 with a lock nut 84 on each adjustment screw 72 to lock the adjustment screw 72 in adjusted position. By adjusting the adjustment screws 72, the base plate 32 may be moved laterally of the rotational axis of the shaft 12 thus moving the end of the shaft 12 remote from the cutter blade assembly to a desired laterally adjusted position radially of the rotational axis of the shaft 12.

As illustrated, the base plate 32 is rectangular and four vertical adjustment cap screws 76 are threaded therethrough at the four corners of the base plate 32 with the lower ends of the cap screws 76 engaging the upper surface of the support plate 64. A lock nut 78 is provided on each vertical adjustment screw 76 to lock the screws 76 in adjusted position thereby enabling the bearing support plate 30 and thus the shaft 12 to be vertically adjusted radially of the rotational axis of the shaft 12. Also, by adjusting selected adjustment screws 76, the vertical orientation of the bearing support plate 30 may be varied, that is, it may be tilted to vary the vertical plane in which the bearing support plate 30 is positioned thereby enabling accurate alignment of the blade assembly with the cutting surface of the die with the blade edges which cut the pellets being maintained parallel to the cutting surface of the die.

In order to retain the base plate 32 on the support plate 64, a pair of bearing bolts 80 extend through the base plate 32 and the support plate 64 outwardly of the frame 18 with the bolts 80 being at the center of the base plate 32 adjacent the side edges thereof outwardly of the bearing support plate 30 as illustrated in FIG. 1 with the aperture through the support plate 64 being laterally elongated to enable lateral adjustment of the base plate 32 and also enabling limited adjustment of the bearing support plate 30 in a vertical plane while precluding movement of the base plate 32 toward or away from the flange 66 on the support plate 64 thereby providing accurate and positive support for the rotatably adjustable bearing housing.

By providing the unique manual adjustment of the present invention, long blade life can be expected as compared to presently used blade adjustments which employ spring-loaded cutter hubs, hydraulic mechanisms or machined sliding bases. This invention provides a relatively simple and inexpensive means for accomplishing blade adjustment. The adjustment of this invention provides for radial movement and linear movement of the blade assembly in relation to its rotational axis and also provides alignment of the blade assembly with the cutting surface of the die and enables the blade cutting edges to be oriented in accurate parallel relation to the die cutting surface. This adjustment which not only provides for radial movement (cutter shaft speed) and axial movement (cutter blade to die adjustment) but also for vertical and horizontal positioning of the rear bearing assembly thereby allowing for adjusting parallelism of the blade to the die to within 0.005 inches. This adjustment is quite important when pelletizing polymers which smear easily. When pelletizing polymers which smear easily, if parallelism is not obtained, the cutter will quickly cake up and shut down as plastic wraps around the blades and shaft. Thus, it is a significant feature of this invention to eliminate misalignment of the blade and to eliminate out-of-parallel relation between the blade and die surface. The stop screw provides a positive stop to prevent the blade assembly from grinding into the die cutting surface thereby prolonging the life expectancy of the blades by using a relatively inexpensive arrangement which has a simplicity of structure which enables effective replacement of parts while maintaining effective cutting of pellets when using various polymers to form the pellets.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In an underwater pelletizer including a rotatable cutter blade assembly associated with a cutting surface of a die for forming pellets and including a drive shaft, means adjustably supporting the drive shaft for adjustable movement axially of the axis of rotation and radially of the axis of rotation for adjusting the cutter blade assembly in relation to the cutting surface on the die said adjustably supporting means being manually operable to accurately adjust the position of the cutter blade assembly and said adjustably supporting means including a bearing journalling the shaft, a bearing housing mounting the bearing and a bearing support plate, said bearing housing being threaded through the bearing support plate for rotational movement of the bearing housing and axial movement of the bearing and shaft.

2. The structure as defined in claim 1 wherein said bearing support plate includes an adjustable stop member engageable with the bearing housing to limit axial movement of the bearing housing in one direction to limit movement of the cutter blade assembly towards the cutting surface on the die.

3. The structure as defined in claim 1 together with means supporting the bearing support plate for lateral adjustment, vertical adjustment and variation of the plane of the bearing support plate from the vertical.

4. The structure as defined in claim 3 wherein said bearing support plate includes a base plate, said means supporting the bearing support plate including lateral adjustment screws engaged with the base plate for moving the base plate laterally and a plurality of vertical adjustment screws for moving the base plate vertically and tilting the base plate and bearing support plate about a transverse axis to vary the plane of the bearing support plate.

5. The structure as defined in claim 1 wherein said bearing housing is cylindrical to facilitate gripping for rotational movement, said housing including an end recess receiving said bearing, and a removable end plate forming a closure for the recess and retaining the bearing in the recess to exert axial thrust on the shaft when the bearing housing is rotated.

6. The structure as defined in claim 5 together with means supporting the bearing support plate for lateral adjustment, vertical adjustment and variation of the plane of the bearing support plate from the vertical.

* * * * *